United States Patent [19]

Hurford

[11] 3,783,188

[45] Jan. 1, 1974

[54] FADE-TO-BLACK VIDEO SIGNAL PROCESSING APPARATUS

[75] Inventor: Winslow Leroy Hurford, Cape Coral, Fla.

[73] Assignee: RCA Corporation, New York, N.Y.

[22] Filed: Apr. 17, 1972

[21] Appl. No.: 244,564

[52] U.S. Cl........... 178/6.8, 178/69.5 G, 178/DIG. 6

[51] Int. Cl............................................... H04n 5/22

[58] Field of Search......................... 178/DIG. 6, 6.8, 178/7.35, 7.55, 69.5 G, 5.45 Y, 7.3 DC, 7.5 DC

[56] References Cited

UNITED STATES PATENTS 3,673,324 6/1972 Ito.................................. 178/DIG. 6

*Primary Examiner*—Benedict V. Safourek
*Assistant Examiner*—George G. Stellar
*Attorney*—Eugene M. Whitacre

[57] ABSTRACT

Fade-to-black video signal processing apparatus, used to fade picture portions of a video signal provided from a source not synchronized to available studio sync, employs an analog multiplier as a fader element. Apparatus to regenerate horizontal and vertical blanking interval pulses, arranged for synchronization with the video signal, is used to place the analog multiplier into full gain condition during the horizontal and vertical blanking intervals of the video signal.

6 Claims, 5 Drawing Figures

FADE-TO-BLACK VIDEO SIGNAL PROCESSING APPARATUS

The present invention relates to video signal processing apparatus suitable for use with video signal switching apparatus in the studio or control room of a television broadcasting station and, in particular, fade-to-black video signal processing apparatus for controllably attenuating the picture portion of a video signal without affecting its synchronizing ("sync") and burst information portions.

Switching from one video signal source to another to provide a selected one of those signals for broadcasting is a common occurrence in a television studio or transmitter facility. If the two video sources are synchronized to the same sync and burst signal generators, ths switching may be done simply using a cross-fader. If the two video sources are "nonsynchronous," being timed with respect to different sync and burst signal generators, such as where one video signal source is locally originated and the other remotely originated, cross-fading between the signals is undesirable, since during the cross-fade transition the sync and burst information of one source may appear in the picture information of the other.

Switching between such "non-synchronous" video signals can be done if the station sync and burst signal generators are synchronized by phase-lock loops to the remote sync and burst signal generators whenever the remotely originated video signal is being broadcast. Switching from a locally originated source to a remotely originated one is accomplished then by switching to an intermediate black-level source for a period of time sufficient for the station sync and burst signal generators to be pulled into synchronism with the remote sync and burst signal generators by the phase-lock loops. A tight phase-lock between local and remote sync and burst generators may undesirably take an amount of time apparent to the viewer, and slight phase errors in phaselock between burst generators are apt to cause erroneous hue in the pictures provided from one or both of the originating sources.

It is desirable to switch between sources of video signal without synchronizing their respective sync and burst signal generators, thereby avoiding the problems associated with phase-locking those signal generators, and to provide video signal processing apparatus to remove the video signal transients produced by such switching from the video signal transmitted to the viewer.

The present invention is embodied in fade-to-black video signal processing apparatus which is adapted to receive at its input terminals input video signals having horizontal and vertical blanking intervals, picture intervals therebetween and synchronizing pulses during those blanking intervals. A means responsive to the synchronizing pulses in the input video signals is coupled to the input terminals of the video signal processing apparatus and provides horizontal and vertical blanking interval pulse signals timed to be in synchronism with the horizontal and vertical blanking intervals of the input video signals. A source of adjustable direct current control signals and the means providing vertical and horizontal blanking interval pulse signals are coupled to switching means. The switching means provides a first predetermined output level during the time of the horizontal and vertical blanking interval pulse signals and a second output level during the time between said horizontal and vertical blanking interval pulses, which second output level is a function of the adjustable direct current control signal. An analog multiplier is coupled to the input terminals of the video signal processing apparatus and to the switching means and provides output video signals which are the product of the input video signals and the output levels from the switching means. Accordingly, the analog multiplier exhibits a predetermined gain during the time of said horizontal and vertical blanking interval pulse signals and a gain determined by the adjustable direct current control signal during the time between the horizontal and vertical blanking interval pulse signals.

The present invention in its various aspects will be better understood by reference to the following drawings and the detailed description thereof, in which.

Figure 1:
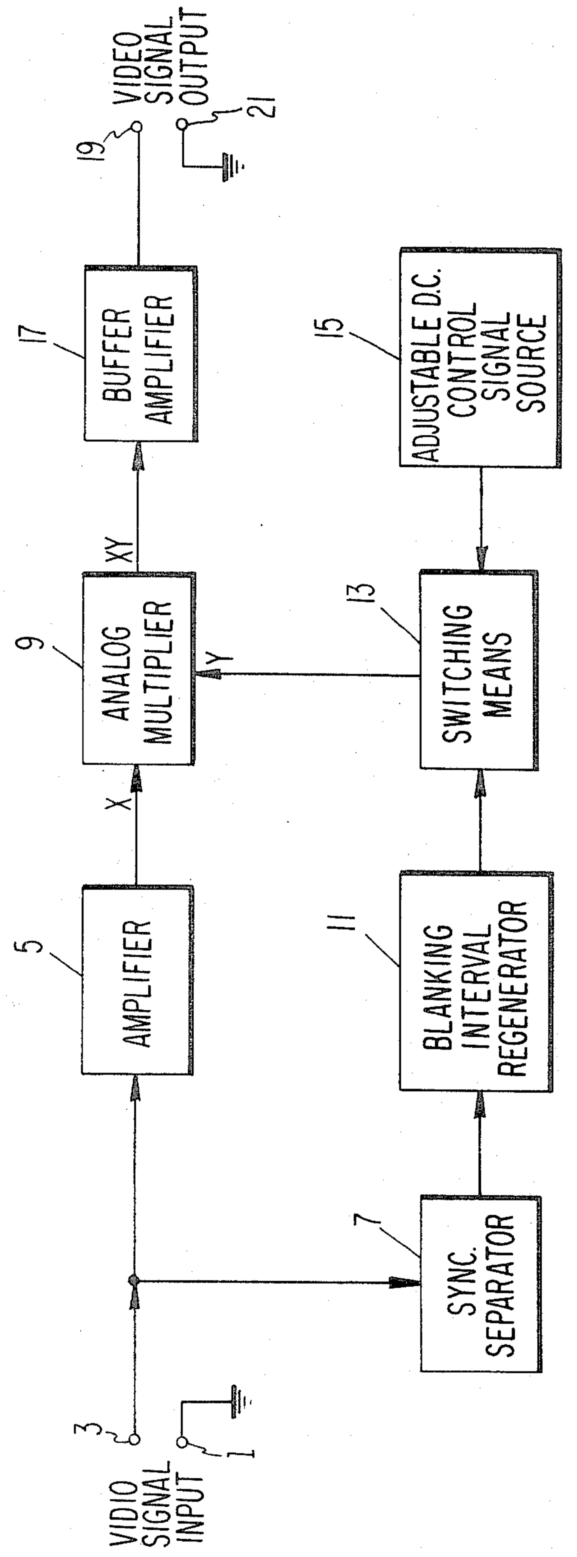
FIGS. 1 and 2 are block and partial circuit schematics, respectively, of an embodiment of the invention.

Referring now to FIG. 1, input video signals as may be provided from video signal switching apparatus are applied via input terminals 1, 3 to the input circuits of an amplifier 5 and a sync separator 7, respectively. The output circuit of amplifier 5 is coupled to a first input circuit of an analog multiplier 9 and provides a video input signal denominated as X thereto.

An analog multiplier has first and second input circuits to accept first and second input signals X, Y and an outpt circuit to provide an output signal XY which is the product of the first and second input signals. An analog multiplier is insofar as the present invention is concerned an amplifier the gain of which for X signals is independent of their amplitude and is controllable in response to a continuous range of Y signals.

The sync separator 7 provides at its output circuit separated pulses corresponding to the horizontal sync pulses and equalizing pulses contained in the input video signals. These separated sync pulses are applied to the input circuit of a blanking interval regenerator 11 which generates pulses corresponding to the horizontal and vertical blanking intervals of the input video signals, as timed by the separated sync pulses applied to its input circuit.

A switching means 13 is provided an adjustable direct current control signal from source 15 and provides an output signal Y to a second input circuit of the analog multiplier 9. The pulses provided from the blanking interval of the blanking interval regenerator 11 are applied to the switching means 13 to condition it to provide a predetermined first output level during the horizontal and vertical blanking intervals, which first output level causes the analog multiplier 9 to have full gain for video signals therethrough, and to provide a second output level responsive to the adjustable direct current control signal from source 15 during the time between those blanking intervals, which second output level determines the analog multiplier gain for video signals therethrough during their picture intervals.

Output video signals from the fade-to-black video signal processing apparatus appear between terminals 19, 21, XY output signals from the analog multiplier 9 being coupled to terminal 19 via buffer amplifier 17.

The fade-to-black video processing apparatus shown in FIG. 1 can be connected in cascade after video signal switching apparatus which selects a video signal to be broadcast from a plurality of available video signals. By adjusting the source 15 to fade down to black and provide full attenuation in the analog multiplier 9 prior to switching, and by adjusting the source 15 to fade up from black and restore full gain in the analog multiplier 9 after switching, the transient effects of switching between video signal sources will not be noticeable to a viewer of signals provided from the fade-to-black video processing apparatus.

Figure 2:
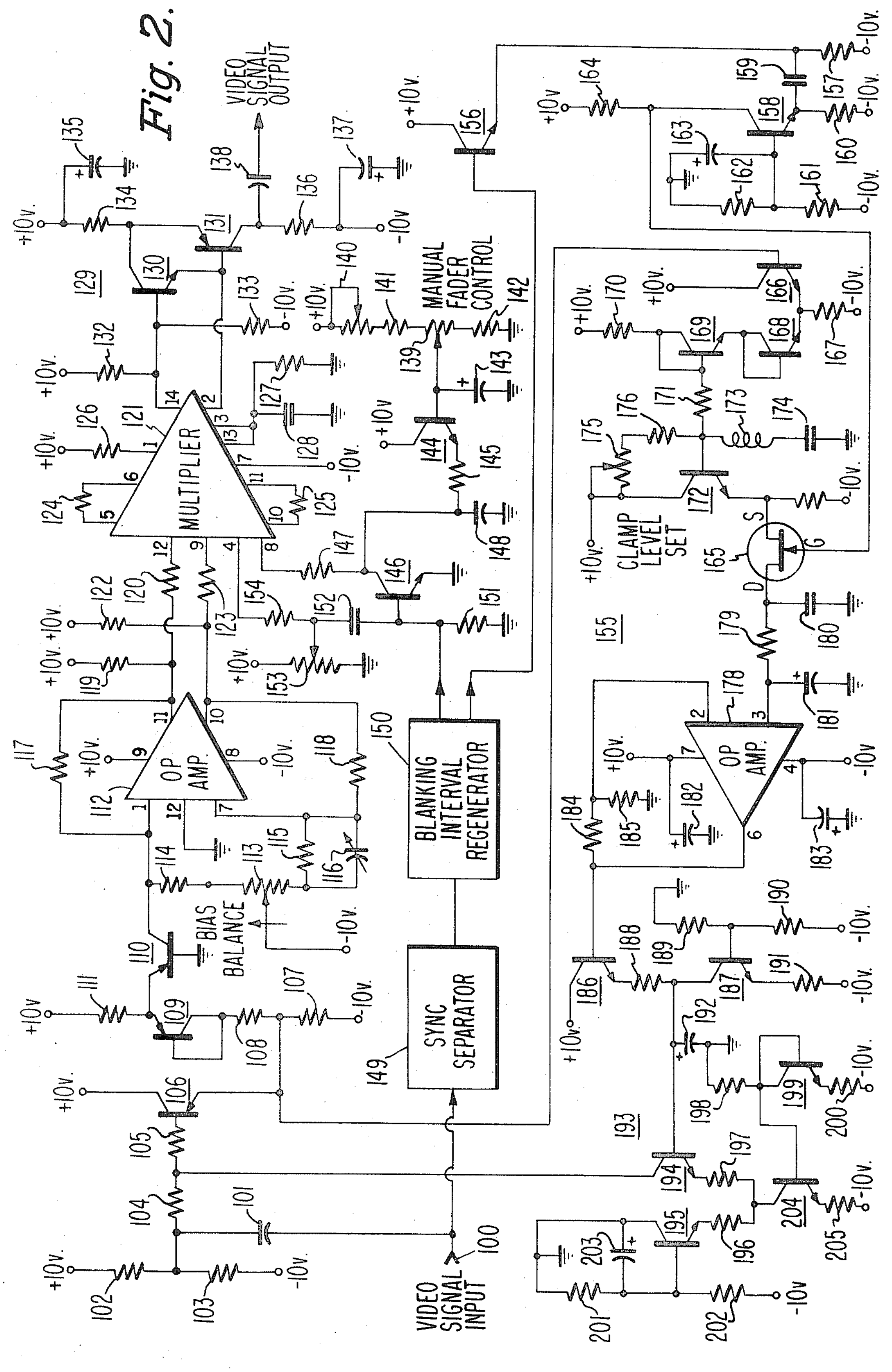

FIG. 2 shows in partial-circuit schematic form the fade-to-black video signal processing apparatus shown in block schematic form in FIG. 1.

Input video signals applied to terminal 100 are amplifier in amplifier transistors 106, 110 and the operational amplifier 112. Anti-phase amplified input video (X) signals are supplied to the analog multiplier 121 (at its terminals 12, 9) from the operational amplifier 112. Anti-phase XY video signals are provided from the analog multiplier 121 (at its terminals 14, 2) to a buffer amplifier 129 comprising elements 130–138.

The gain of the fade-to-black video signal processing apparatus during picture intervals is determined in response to operator control of a potentiometer 139 (labelled "MANUAL FADER CONTROL"). The potentiometers 139, 140 and resistors 141, 142 form an adjustable resistive voltage divider which provides control voltage intermediate between 0 and +10 volts. This control voltage is coupled through the emitter follower transistor 144 and the series combination of resistors 145 and 147 to terminal 8 of the analog multiplier to control its gain.

The sync separator 149 provides separated sync pulses timed in accordance with the sync pulses of video signals applied to it via the video signal input terminal 100. These separated sync pulses are applied to a blanking interval regenerator 150 which responds to the sync pulses to provide positive-going horizontal and vertical blanking interval pulse signals for application to the base electrode of the grounded-emitter transistor 146. These positive-going pulses cause the otherwise non-conductive collector-to-emitter path of the transistor 146 to be highly conductive, clamping terminal 8 of the analog multiplier 121 to ground reference potential and causing it to provide full gain for video signals during blanking intervals. The positive-going pulses are also coupled via the capacitor 152 and the resistor 154 to terminal 4 of the analog multiplier 121 to help put it into its full-gain condition.

The blanking interval regenerator 150 also provides pulses during the horizontal blanking interval to the base electrode of an NPN transistor 156 in black-level restoration circuitry 155 used to re-establish the black level of input video signals to a fixed level after they have passed through the coupling capacitor 101. The elements 156–164 form a delay amplifier stage which delays the pulses from the blanking interval regenerator 150 slightly and provides keying pulses to the gate electrode of a field effect transistor 165 during the "back porch" of the horizontal blanking interval (the portion of that interval following the trailing edge of the horizontal sync pulse).

Video signals at the interconnection of resistors 104, 105 are coupled via emitter-follower transistors 106, 166; temperature-compensating diode-connected transistors 168, 169 and resistor 171 to the base electrode of an emitter-follower transistor 172. The series combination of inductor 173 and capacitor 174 is tuned to color subcarrier frequency and removes burst information from the "back porch" intervals of the video signals appearing at the base and emitter electrodes of transistor 172. The field effect transistor 165, keyed into conduction during the back porch intervals of the video signals, changes the capacitor 180 to a voltage corresponding to the black level of the video signals at the emitter electrode of transistor 172. This voltage is amplified in the operational amplifier 178 and applied to the input circuit of a voltage comparator 193, which develops an error signal current to be fed back to the interconnection of resistors 104, 105 to correct black level there. Suitable elements for use in the circuit shown in FIG. 2 are tabulated below.

| | | |
|---|---|---|
| RESISTORS | | ohms |
| 102 | | 11,000 |
| 103 | | 9,090 |
| 104 | | 221 |
| 105, 147, 154, 205 | | 100 |
| 107, 124, 125, 45, 177 | | 1,000 |
| 108 | | 3,160 |
| 111, 117, 118, 119, 122, 133 | | 3,320 |
| 114, 115 | | 3,010 |
| 120, 123 | | 1,500 |
| 126, 100, 171, 191 | | 680 |
| 127 | | 1,200 |
| 132 | | 511 |
| 134 | | 200 |
| 136 | | 432 |
| 142 | | 619 |
| 151, 170, 185 | | 10,000 |
| 157, 189 | | 2,200 |
| 161, 162 | | 3,300 |
| 164 | | 5,100 |
| 167, 188 | | 2,000 |
| 176 | | 2,870 |
| 179 | | 20,000 |
| 184 | | 510,000 |
| 190, 198 | | 7,500 |
| 200 | | 1,800 |
| 201, 202 | | 3,900 |
| POTENTIOMETERS | | ohms |
| 113, 140 | | 1,000 |
| 139, 175 | | 2,000 |
| 153 | | 10,000 |
| CAPACITORS | | |
| 101 | | 150 μf/6V |
| 116 | | 2.5 – 9 pf |
| 128, 143, 192, 203 | | 3.3 μf/15V |
| 135, 137, 182, 183 | | 120 μf/15V |
| 138 | | 120 μf/6V |
| 148 | | 220 pf |
| 152 | | 120 μf/10V |
| 159 | | 5,600 pf |
| 163 | | 4.7 μf/10V |
| 174 | | 470 pf |
| 180 | | 1,000 pf |
| 181 | | 2.2 μf/15V |
| TRANSISTORS | | |
| 106, 144, 145, 186 | | 2N2222 |
| 109, 110, 131 | | 2N3906 |
| 130, 156, 158 | | 2N3904 |
| 165 | | 2N4039 |
| INTEGRATED CIRCUITS | | |
| 112 | RCA Corporation | CA3005 |
| 121 | Motorola Semiductor Products Inc. | MC1595 |
| (166, 168, 169, 172, 186, 187) | RCA Corporation | CA3045 |
| 178 | Fairchild Instruments Inc. | μa 741 |
| (194, 195, 199 204) | RCA Corporation | CA3018A |

Figure 3:
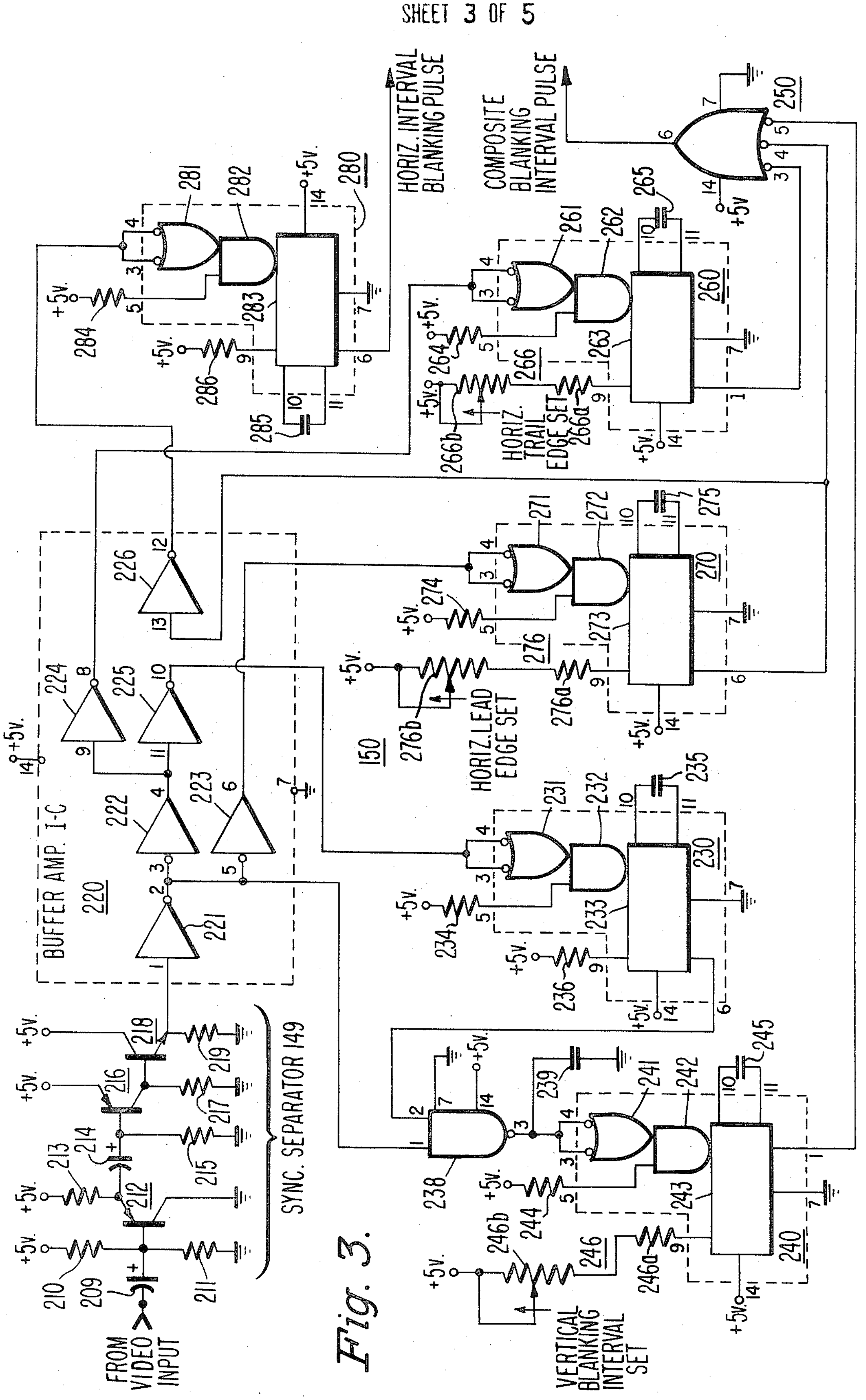
FIG. 3 is a more detailed schematic of the sync separator and blanking interval regenerator, both of which are shown in block schematic form in FIGS. 1 and 2.
Figure 4:
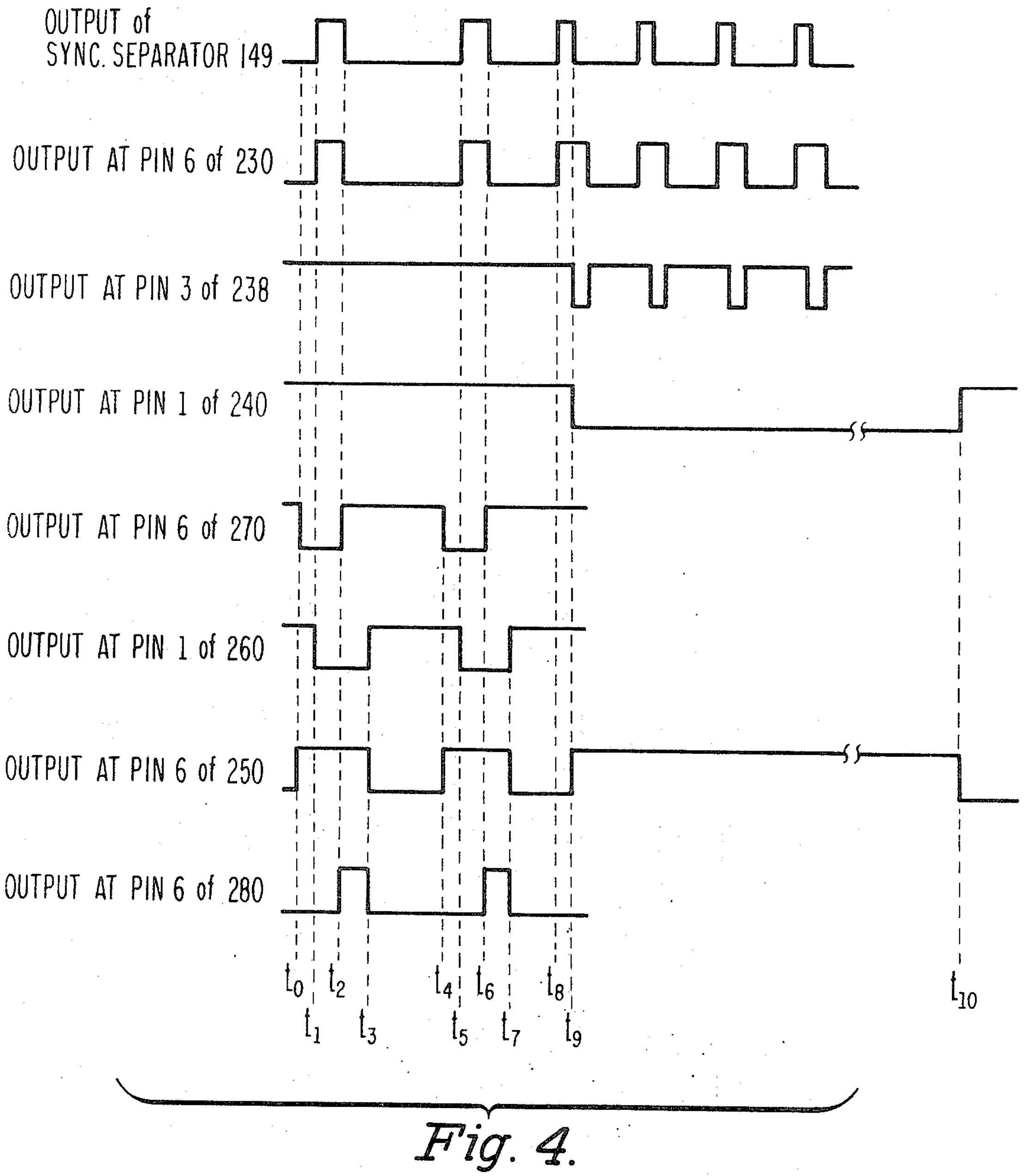
FIG. 4 is a timing diagram showing the relative timings of signals associated with the blanking interval regenerator.

FIG. 3 schematically shows the sync separator 149 and blanking interval regenerator 150 shown in block schematic form in FIG. 2, and FIG. 4 shows voltage waveforms at points in the blanking interval regenerator 150.

The top waveform in FIG. 4 illustrates the voltage waveform at the output of the sync separator 149 during the last two horizontal lines of a television frame and the beginning of an ensuing vertical blanking or retrace interval. The first two, wider pulses in this waveform are horizontal sync pulses and the last four, narrower pulses are equalizing pulses. Time $t_0$ corresponds to the beginning of the horizontal blanking interval including the first of the horizontal sync pulses shown; time $t_1$, to the leading edge of the first horizontal sync pulse shown; time $t_2$, to its trailing edge; time $t_3$, to the end of the horizontal blanking interval which includes the first horizontal sync pulse shown; time $t_4$, to the beginning of the horizontal blanking interval which includes the second of the horizontal sync pulses shown and the last of the frame; time $t_5$, to the leading edge of the second horizontal sync pulse shown; time $t_6$, to its trailing edge; time $t_7$, to the end of the horizontal blanking interval which includes the second of the horizontal sync pulses shown as the last in its frame interval; time $t_8$, to the leading edge of the first equalizing pulse; time $t_9$, to its trailing edge and to the beginning of the regenerated vertical blanking interval; and time $t_{10}$, to the end of the regenerated vertical blanking interval.

In response to separated sync pulses from the sync separator 149 negative-going separated sync pulses are provided at terminals 2, 8 and 10 of the buffer amplifier integrated circuit (IC) 220 (shown in FIG. 3), and positive-going separated sync pulses are provided at its terminal 6.

Each of the integrated circuits 230, 240, 260, 270, 280 and 440 (in FIG. 5) is biased to function as a one-shot (or monostable) and is triggered into its unstable logic state by negative-going logic transitions applied to its terminals 3, 4. After a period determined by the capacitance of the capacitor coupling its terminals 10, 11 and the resistance of the resistor coupling its terminal 9 to a bias supply voltage such a one-shot will return to its stable logic state. In the stable logic state terminal 1 of the one-shot is at a higher potential than terminal 6; in the unstable logic state terminal 6 is at a higher potential than terminal 1.

The second from top waveform in FIG. 4 shows a portion of the output signal voltage at terminal 6 of the one-shot 230. The leading edges of the negative-going separated sync pulses at terminal 10 of the buffer amplifier 220 are applied to terminals 3 and 4 of the one-shot 230 to recurrently trigger it into its unstable logic state. The period of the unstable condition is made the same as that of the horizontal synchronizing pulses. Pulses are provided from terminal 6 of the one-shot 230 which have the same duration as horizontal sync pulses, whether initiated by horizontal sync or equalizing pulses.

An AND gate 238 shown in FIG. 3 has an input terminal 1 connected to receive negative-going separated sync pulses and an input terminal 2 connected to receive positive-going normalized-duration pulses from terminal 6 of the integrated circuit 230. These signals are both in a high logic state for a sustained time when and only when normalized-duration pulses are of longer duration than separated sync pulses. This occurs immediately after each equalizing pulse, producing a negative-going pulse at the terminal 3, the inverted signal output terminal of the AND gate 238. The capacitor 239 coupling the terminal 3 to ground suppresses the formation of short pulse spikes at the edges of horizontal sync pulses or the leading edges of equalizing pulses. The third from top waveform of FIG. 4 illustrates the voltage waveform at this terminal 3 of AND gate 238 during the periods preceding and beginning the vertical blanking interval.

The leading edges of the negative-going pulses at terminal 3 of the AND gate 238 applied to terminals 3, 4 of one-shot 240 trigger the one-shot 240 into its unstable logic state. The period for which the one-shot 240 remains in its unstable state is adjusted to correspond to the standard duration of a vertical blanking interval using potentiometer 246b (labelled "VERTICAL BLANKING INTERVAL SET"). As shown in FIG. 4 a negative-going pulse is provided at terminal 1 of one-shot 240 during each vertical blanking interval.

Positive-going sync pulses applied to terminals 3, 4 of the one-shot 270 trigger it into its unstable logic state on their trailing edges. The duration of this unstable logic state is adjusted using potentiometer *276b* (labelled "HORIZ(ONTAL) LEADING EDGE SET") to correspond to the standard interval between the trailing edge of a horizontal sync pulse and the beginning of the next succeeding horizontal blanking interval. The voltage waveform produced at terminal 6 of the one-shot 270 is a string of positive-going pulses, which may alternatively be viewed as a string of negative-going pulses each located early in a horizontal blanking interval, extending from the beginning thereof to the trailing edge of the horizontal sync pulse therein. The fifth from top waveform of FIG. 4 illustrates this waveform between retrace intervals.

Referring back to FIG. 3, leading edges of the negative-going separated sync pulses applied to terminals 3, 4 of the one-shot 260 trigger it into its unstable logic state. The duration of this unstable logic state is adjusted using potentiometer *266b* (labelled "HORIZ(ONTAL) TRAILING EDGE SET") to correspond to the standard duration between a leading edge of horizontal sync pulse and the end of the horizontal blanking interval in which that sync pulse is located. The fourth from top wavefrom in FIG. 4 illustrates the signal voltage at terminal 1 of one-shot 260 between retrace intervals.

The next to bottom waveform of FIG. 4 shows a portion of the composite blanking interval pulses which are coupled to the base electrode of transistor 146 shown in FIG. 2 from the output terminal 6 of a NOR gate 250, shown in FIG. 3. At least one of the input terminals 5, 4, 3 of the NOR gate 250 is provided low-logic-level input voltage during and only during all portions of the vertical and horizontal blanking intervals. The NOR gate 250 responds to provide high-logic-level output voltage only during those blanking intervals and by means of the transistor 146 biases the analog multiplier 121 (shown in FIG. 2) to full gain during those blanking intervals.

The leading edges of the positive-going pulses at terminal 6 of one-shot 270 are applied to amplifier 226 to provide negative-going edges to trigger one-shot 280 into its unstable state. The duration of the unstable state is arranged to last nearly as long as the standard back porch interval. The bottom waveform shown in FIG. 4 shows the relative position of the voltage pulses at terminal 6 of one-shot 280 with respect to horizontal sync pulses during the frame interval. Referring to FIG. 2, these positive-going pulses are coupled to the base electrode of the transistor 156 and are subsequently used to time the detection of black level in the black level restoration circuitry 155. Suitable values for the circuit elements shown in FIG. 3 are tabulated below.

| | | |
|---|---|---|
| RESISTORS | | ohms |
| 210 | | 16,000 |
| 211, 286 | | 11,000 |
| 214, 219 | | 330 |
| 215 | | 120,000 |
| 217 | | 3,900 |
| 234, 244, 264, 274 | | 1,000 |
| 236 | | 4,750 |
| 246*a* | | 3,920 |
| 266*a* | | 1,960 |
| 276*a* | | 38,300 |
| 284 | | 5,000 |
| POTENTIOMETERS | | ohms |
| 246*b*, 276*b* | | 5,000 |
| 286*b* | | 2,000 |
| CAPACITORS | | |
| 209 | | 150 μf/6V |
| CAPACITORS | | 214/15 μf/10V |
| 235 | | 1,000 pf |
| 239 | | 120 pf |
| 245 | | 0.22 μf/50V |
| 265, 275 | | 0.2200 pf |
| 285 | | 5,100 pf |
| TRANSISTORS | | |
| 212 | | 2N3906 |
| 216 | | 2N1683 |
| 218 | | 2N3904 |
| INTEGRATED CIRCUITS | | |
| 220 | Motorola Semiconductor Products Inc. | MC536 |
| 230, 240, 260, 270, 280 | Texas Instruments Inc. | SN74121 |
| 238 | Motorola Semiconductor Products Inc. | MC846 |
| 250 | Motorola Semiconductor Products Inc. | MC562 |

Figure 5:
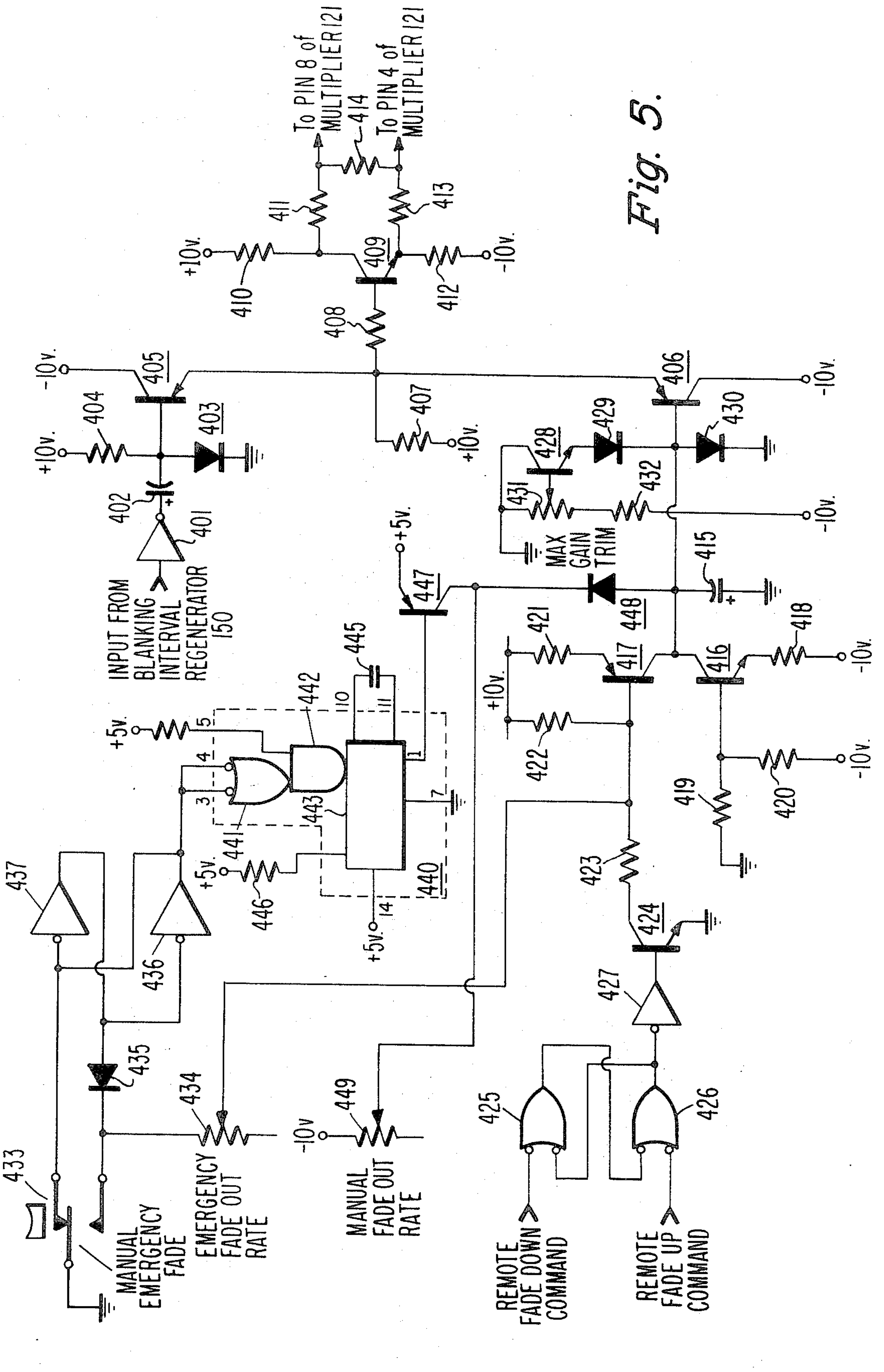
FIG. 5 is a schematic of alternate apparatus for use with circuitry shown in FIG. 2 to permit automatic station control of fade-to-black video signal processing.

FIG. 5 shows in schematic form additive circuitry to replace elements 139–148 and 151–154 of the FIG. 2 circuitry to permit automatic fading up or down of video signals in response to pulse commands.

PNP transistors 405, 406 form a non-additive mixer responsive at their joined emitter electrodes to the more negative of the signal voltages applied to their respective base electrodes. During the horizontal and vertical blanking intervals signal coupled from the blanking interval regenerator 150 via the signal inverting amplifier 401 and capacitor 402 to the base electrode of transistor 405 will determine the voltage at the joined electrodes of the transistors 405, 406. This voltage coupled through the resistor 408, phase-splitter transistor 409 and the resistors 411, 413 to the analog multiplier 101 will condition the analog multiplier 121 for full gain for video signals. During picture intervals of the video signals the voltage at the joined emitter electrodes of transistors 405, 406 may be determined by the potential across capacitor 415 to be of a value which when coupled to the analog multiplier 121 will condition it for reduced gain.

The charge stored in the capacitor 415 determines the potential thereacross. Charge is placed onto the capacitor 415 through the collector electrode of a transistor NPN 416 or the collector electrode of a PNP transistor 417, each connected to the end of a capacitor 415.

Transistor 416 is biased to provide a constant current drain at its collector electrode. In the absence of current flow from the collector electrode of transistor 417, the current flow into the collector electrode of transistor 416 will charge the capacitor 415 to place a negative voltage on the base electrode of transistor 406 and fade down the video signal output to black. The diode 430 prevents reverse polarization of the capacitor 415 during fade down, so that an electrolytic capacitor may be used.

When the collector-to-emitter path of transistor 424 is made conductive by application of positive voltage to its base electrode, the transistor 417 is biased to provide a constant current source at its collector electrode. The constant current supplied by the collector electrode of transistor 417 exceeds the constant current drain through the collector electrode of transistor 416, and the excess current discharges the capacitor 415 to cause a less negative voltage to appear on the base electrode of transistor 406. This fades up the video signal output from black toward maximum picture gain. The setting of the potentiometer 431 (labelled "MAX(IMUM) GAIN TRIM"), controls the maximum downward excursion of voltages applied to the base electrode of the transistor 406 and so controls maximum picture gain.

NOR gates 425 and 426 are connected as a bistable, which bistable is coupled to control the activation of the constant current source provided from the collector electrode of transistor 417. Negative-going pulses may be supplied from automated station control, either as a remote fade-up command to NOR gate 426 or as a remote fade-down command to NOR gate 425.

It is sometimes desirable to fade to black quickly under emergency conditions. This is done by depressing the manual emergency fade S.P.D.T. button switch 433, which switch has normally open and normally closed contacts switchable to ground reference potential. The normally open contact of the switch 433 is connected via an adjustable resistor 434 (labelled "EMERGENCY FADE OUT RATE") to the base electrode of the constant current source transistor 417. Pushing the button switch 433 biases the transistor 417 into conduction and causes fade-down, as heretofore described, at a rate which is determined by the resistance of the variable resistor 434.

The pushing of the button switch 433 clamps the input of the logic-inverting amplifier 436 to its low logic state causing its output to be placed into its high logic state. The logic inverting amplifiers 436 and 437 are so connected that these logic states are stored. Releasing the button switch so that the normally closed contact is returned to ground reference potential clamps the output of the logic-inverting amplifier 436 and the input of the logic-inverting amplifier 437 to ground reference potential. This triggers the one-shot 440 into its unstable logic state. This applies a negative-going pulse to the base electrode of the transistor 447 causing it to rapidly charge the capacitor 415, causing in turn the potential or the base electrode of transistor 406 to become more negative. This action rapidly restores the analog multiplier 121 to full gain.

An adjustable resistor 449 (labelled "MANUAL FADE OUT RATE") is connected between the anode electrode of diode 448 and the −10 volt operating supply, and may be adjusted by the station operator to manually control fade-up rate. The series combination of the diode 448 and the variable resistor 449 act as a current drain in parallel with the constant current drain provided at the collector electrode of the transistor 416. Decreasing the resistance of the variable resistor 449 will increase the speed of fade-up from black.

Suitable values for elements shown in FIG. 4 are tabulated on the following page.

| | |
|---|---|
| RESISTORS | ohms |
| 404 | 160 000 |
| 407 | 4 700 |
| 408, 446 | 10 000 |
| 410, 412 | 2 200 |
| 411, 413, 414 | 6 800 |
| 418 | 6 200 |
| 419, 423 | 8 200 |
| 420, 422 | 2 000 |
| 421 | 3 000 |
| 432 | 5 100 |
| 444 | 1 000 |
| POTENTIOMETERS | ohms |
| 431 | 5 000 |
| 434 | 10 000 |
| 449 | 25 000 |
| CAPACITORS | |
| 402 | 180 μf/10V |
| 415 | 68 μf/10V |
| 445 | 330 μf/6V |
| SEMICONDUCTOR DEVICES | |
| 403, 429, 430 | IN695 |
| 405, 406, 417, 447 | 2N3906 |
| 409, 416, 424, 428 | 2N3904 |
| 435 | IN100 |
| 440 | SN74,121 |
| 448 | IN691 |

What is claimed is:

1. Fade-to-black video signal processing apparatus comprising:

a. input terminals adapted to receive input video signals having horizontal and vertical blanking intervals, picture intervals therebetween and synchronizing pulses during said blanking intervals;

b. means coupled to said input terminals and responsive to said synchronizing pulses to provide horizontal and vertical blanking interval pulse signals timed to be in synchronism with said horizontal and vertical blanking intervals of said input video signals;

c. a source of adjustable direct current control signal;

d. switching means coupled to said source of adjustable direct current control signals and to said means providing horizontal and vertical blanking interval pulse signals to provide a predetermined first output level during the time of said horizontal and vertical blanking interval pulse signals and a second output level during the time between said horizontal and vertical blanking interval pulses which is a function of said adjustable direct current control signal; and e. an analog multiplier, coupled to said input terminals and to said switching means, for providing output video signals which are the product of said input video signals and the output levels from said switching means such that said analog multiplier exhibits a predetermined gain during the time of said horizontal and vertical blanking interval pulse signals and a gain determined by said adjustable direct current control signal during the time between said horizontal and vertical blanking interval pulse signals; and wherein said means to provide blanking interval pulse signals comprises:

a. a sync separator having an input coupled to said input terminals and an output to provide separated synchronizing pulses in response to said synchronizing pulses;

b. trigger generating means having an input coupled to said output of said sync separator and having an output to provide triggering pulses in response to pulses supplied to its said input which are shorter in duration than the horizontal synchronizing pulses in said input video signals;

c. a first one-shot having a trigger input coupled to said output of said trigger generating means and having an output to provide regenerated vertical blanking interval pulses, each of said regenerated vertical blanking interval pulses being provided by said first one-shot being placed into its unstable logic state in response to one of said trigger pulses and returning to its stable logic state after a duration selected to be equal in length to one of said vertical blanking intervals;

d. a second one-shot having a trigger input coupled to said output of said sync separator and having an output to provide regenerated first partial horizontal blanking interval pulses, each of said regenerated first partial horizontal blanking interval pulses being provided by said second one-shot being placed into its unstable logic state in response to an edge of a particular separated horizontal synchronizing pulse and returning to its stable logic state after a duration selected to be equal to that of the remainder of the horizontal blanking interval in which the immediately aforesaid particular separated horizontal synchronizing pulse occurs;

e. a third one-shot having a trigger input coupled to said output of said sync separator and having an output to provide regenerated second partial horizontal blanking interval pulses, each of said second partial horizontal blanking interval pulses being provided when said third one-shot is returned to and in its stable logic state, said third one-shot being placed into its unstable logic state in response to an edge of a particular separated horizontal synchronizing pulse and returning to its stable logic state after a duration selected to be equal to that of the remainder of the horizontal blanking interval in which the immediately aforesaid particular separated horizontal synchronizing pulse occurs plus the ensuing picture interval; and f. first pulse combining means having first, second and third inputs each coupled to respective separate ones of the outputs of said first, said second and said third one-shots and having an output maintained in one logic state when any of said regenerated vertical blanking pulses, said regenerated first partial horizontal blanking pulses and said second partial horizontal blanking pulses are formed and in a second logic state when they are all absent, said output of said first pulse combining means thereby providing said horizontal and vertical blanking interval pulse signals.

2. Blanking interval pulse signal regeneration means as claimed in claim 1 wherein said sync separator provides at its output separated equalizing pulses in response to equalizing pulses in said video signal and wherein said trigger generating means comprises:

a. a fourth one-shot having a trigger input coupled to said output of said sync separator and having an output to provide normalized duration pulses, each of said normalized duration pulses being provided when said fourth one-shot is placed into its unstable logic state in response to leading edges of said separated horizontal synchronizing pulses and said equalizing pulses and returning to its stable logic state after a duration selected to be equal to that of a horizontal synchronizing pulse, and b. second pulse combining means having a first input coupled to said output of said sync separator, having a second input coupled to said output of said fourth one-shot and having an output coupled to said trigger input of said first one-shot, said second pulse combining means being responsive to the simultaneous absence of separated horizontal synchronizing pulses and equalizing pulses at its said first input and the presence of normalized duration pulses at its said second input to be maintained in a first logic state and otherwise to be maintained in a second logic state.

3. Fade-to-black video signal processing apparatus comprising:

a. input terminals adapted to receive input video signals having horizontal and vertical blanking intervals, picture intervals therebetween and synchronizing pulses during said blanking intervals;

b. means coupled to said input terminals and responsive to said synchronizing pulses to provide horizontal and vertical blanking interval pulse signals timed to be in synchronism with said horizontal and vertical blanking intervals of said input video signals;

c. a source of adjustable direct current control signal;

d. switching means coupled to said source of adjustable direct current control signals and to said means providing horizontal and vertical blanking interval pulse signals to provide a predetermined first output level during the time of said horizontal and vertical blanking interval pulse signals and a second output level during the time between said horizontal and vertical blanking interval pulses which is a function of said adjustable direct current control signal; and e. an analog multiplier, coupled to said input terminals and to said switching means, for providing output video signals which are the product of said input video signals and the output levels from said switching means such that said analog multiplier exhibits a predetermined gain during the time of said horizontal and vertical blanking interval pulse signals and a gain determined by said adjustable direct current control signal during the time between said horizontal and vertical blanking interval pulse signals; and wherein:

non-additive mixer means are included in said switching means, said non-additive mixer means having a first input circuit coupled to said source of variable direct-current control signals, having a second input circuit coupled to said means to provide pulse signals, and having an output circuit from which it provides said output levels responsive to the one of the signals applied to its said first and said second inputs having the larger departure in level from a fixed reference level.

4. Fade-to-black video signal processing apparatus as claimed in claim 3 including:

a. a direct current source and a direct current drain each connected to said first input of said non-additive mixer means, at least one of which is controllable, and b. charge storage means connected to said first input of said non-additive mixer means.

5. Blanking interval pulse signal regenerator suitable for use in fade-to-black video signal processing apparatus requiring regenerated horizontal and vertical blanking interval pulse signals to pass a video signal therethrough at full gain during its horizontal and vertical blanking intervals, said video signal having horizontal synchronizing pulses, said blanking interval pulse signal regenerator comprising:

a. a sync separator having an input to accept said video signal and having an output providing separated horizontal synchronizing pulses responsive to said horizontal synchronizing pulses and of like timing and duration;

b. trigger generating means having an input to accept said video signals, having an output and being responsive to the beginning of each of said vertical blanking intervals of said video signal to provide trigger pulses at its said output;

c. a first one-shot having a trigger input coupled to said output of said trigger generating means and having an output to provide regenerated vertical blanking interval pulses, each of said regenerated vertical blanking interval pulses being provided by said first one-shot being placed into its unstable logic state in response to one of said trigger pulses and returning to its stable logic state after a duration selected to be equal in length to one of said vertical blanking intervals;

d. a second one-shot having a trigger input coupled to said output of said sync separator and having an output to provide regenerated first partial horizontal blanking interval pulses, each of said regenerated first partial horizontal blanking interval pulses being provided by said second one-shot being placed into its unstable logic state in response to an edge of a particular separated horizontal synchronizing pulse and returning to its stable logic state after a duration selected to be equal to that of the remainder of the horizontal blanking interval on which the immediately aforesaid particular separated horizontal synchronizing pulse occurs;

e. a third one-shot having a trigger input coupled to said output of said sync separator and having an output to provide regenerated second partial horizontal blanking interval pulses, each of said second partial horizontal blanking interval pulses being provided when said third one-shot is returned to and in its stable logic state, said third one-shot being placed into its unstable logic state in response to an edge of a particular separated horizontal synchronizing pulse and returning to its stable logic state after a duration selected to be equal to that of the remainder of the horizontal blanking interval in which the immediately aforesaid particular separate horizontal synchronizing pulse occurs plus the ensuing picture interval; and f. first pulse combining means having first, second and third inputs each coupled to respective separate ones of the outputs of said first, said second and said third one-shots and having an output maintained in one logic state when any of said regenerated vertical blanking pulses, said regenerated first partial horizontal blanking pulses and said second partial horizontal blanking pulses are present and in a seocnd logic state when they all are absent, said output of said first pulse combining means thereby providing said regenerated horizontal and vertical blanking interval pulse signal.

6. Blanking interval pulse signal regenerator as claimed in claim 5 wherein said sync separator provides at its output separated equalizing pulses in response to equalizing pulses in said video signal and wherein said trigger generating means comprises:

a. a fourth one-shot having a trigger input coupled to said output of said sync separator and having an output to provide normalized duration pulses, each of said normalized duration pulses being provided when said fourth one-shot is placed into its unstable logic state in response to leading edges of said separated horizontal synchronizing pulses and said equalizing pulses and returning to its stable logic state after a duration selected to be equal to that of a horizontal synchronizing pulse, and b. second pulse combining means having a first input coupled to said output of said sync separator, having a second input coupled to said output of said fourth one-shot and having an output coupled to said trigger input of said first one-shot, said second pulse combining means being responsive to the simultaneous absence of separated horizontal synchronizing pulses and equalizing pulses at its said first input and the presence of normalized duration pulses at its said second input to be maintained in a first logic state and otherwise to be maintained in a second logic state.

* * * * *